United States Patent [19]

Ari et al.

[11] Patent Number: 4,760,485
[45] Date of Patent: Jul. 26, 1988

[54] ZINE OXIDE SURGE ARRESTERS

[75] Inventors: Niyazi Ari, Nussbaumen; Diethard Hansen, Berikon; Hendrik Hoitink, Windisch; Hans Schär, Basel, all of Switzerland

[73] Assignee: BBC Brown, Boveri & Company, Ltd., Baden, Switzerland

[21] Appl. No.: 819,059

[22] Filed: Jan. 15, 1986

[30] Foreign Application Priority Data

Jan. 15, 1985 [CH] Switzerland ............... 176/85

[51] Int. Cl.$^4$ ............................................. H02H 9/00
[52] U.S. Cl. ........................................ 361/54; 361/111; 361/118; 361/126; 338/333
[58] Field of Search ............... 338/21, 333; 361/54, 361/55, 56, 57, 111, 118, 119, 126

[56] References Cited

U.S. PATENT DOCUMENTS

| | | | |
|---|---|---|---|
| 3,711,794 | 1/1973 | Tasca et al. ........................ 333/96 |
| 4,021,759 | 5/1977 | Campi .................................. 333/70 |
| 4,021,760 | 5/1977 | Campi .................................. 333/70 |
| 4,198,613 | 4/1980 | Whitley ............................... 333/181 |
| 4,271,446 | 6/1981 | Comstock ....................... 361/111 X |
| 4,563,720 | 1/1986 | Clark ............................... 361/111 X |

OTHER PUBLICATIONS

Dehn & Sohne Elektrotechnische Fabrik GmbH, Druckschrift No. 492/82, 1982, p. 8, FIG. 5.

Primary Examiner—A. D. Pellinen
Assistant Examiner—Jeffrey A. Gaffin
Attorney, Agent, or Firm—Burns, Doane, Swecker & Mathis

[57] ABSTRACT

Zinc oxide surge arresters are used to replace capacitive elements for voltages below the pick-up voltage of the surge arrester. Advantageously, the surge arresters may be provided in an alternating current network to provide a high degree of protection against transient disturbances without increasing cost.

12 Claims, 1 Drawing Sheet

ZINE OXIDE SURGE ARRESTERS

BACKGROUND OF THE INVENTION

The present invention relates to surge arresters.

ZnO surge arresters, also designated varistors, are usually employed as voltage limiting elements in electrical circuits. This particular operation is well-known, as evidenced by the 1984 sales catalog of the H. Schaffner Industrieelektronik GmbH Co., Theodor-Rehbock-Str. 5, D-7500 Karlsruhe, Federal Republic of Germany. On page 59 of this catalog a filter circuit designated FN 35 2Z-10/03 for an alternating current electrical network consisting of a phase conductor, a neutral conductor and a ground conductor is shown. In this circuit the ZnO surge arresters are connected parallel to the so-called X capacitors with capacitances in the uF range (here 0.22 uF) between the phase conductor and the neutral conductor. They serve to limit voltage surges caused by differential mode disturbances occurring between the phase conductor and the neutral conductor. The known circuit provides no protection against voltage surges generated by common mode disturbances occurring between the phase conductor and the ground conductor or between the neutral conductor and the ground conductor as there are no surge arresters connected between these conductors. However, such an additional surge protection is necessary in NEMP (nuclear electromagnetic pulse) and EMC (electromagnetic compatibility) applications. In the known circuit merely so-called Y capacitors are present for transient filtering. For reasons of accidental contact protection these capacitors in contrast to the X capacitors have capacitances in the nF range (here 15 nF) only.

One object of the present invention is to provide increased protection against voltage surges in electric circuits containing capacitive elements having values of up to approximately 100 nF without increasing the cost of the circuit.

SUMMARY OF THE INVENTION

The invention utilizes the discovery that ZnO surge arresters in the case of voltages less than their pickup voltage at which they become conducting, essentially behave as capacitors. Depending on their material and configuration, "ZnO capacitors" have typical capacitances of 1 nF. As the realistically attainable upper limit of capacitance a value of 100 nF may be assumed.

The present invention has the advantage that no additional structural parts are needed for surge protection in electrical circuits containing capacitors with capacitances in the nF range, rather it is merely necessary to replace the existing capacitors with ZnO surge arresters. "ZnO capacitors" of this type may be loaded to high voltages. The loss angle increases with rising voltages, which is particularly advantageous for example in applications to filter circuits. Furthermore, ZnO surge arresters are highly cost effective structural parts. The invention therefore is applicable advantageously in the so-called NEMP protection or EMC applications, as these applications require cost effective network filters.

BRIEF DESCRIPTION OF THE DRAWINGS

The objects, features and advantages of the present invention will become fully apparent from the following detailed description when read in light of the accompanying drawings, in which.

DETAILED DESCRIPTION OF THE PREFERRED EMBODIMENT

Figure 1:
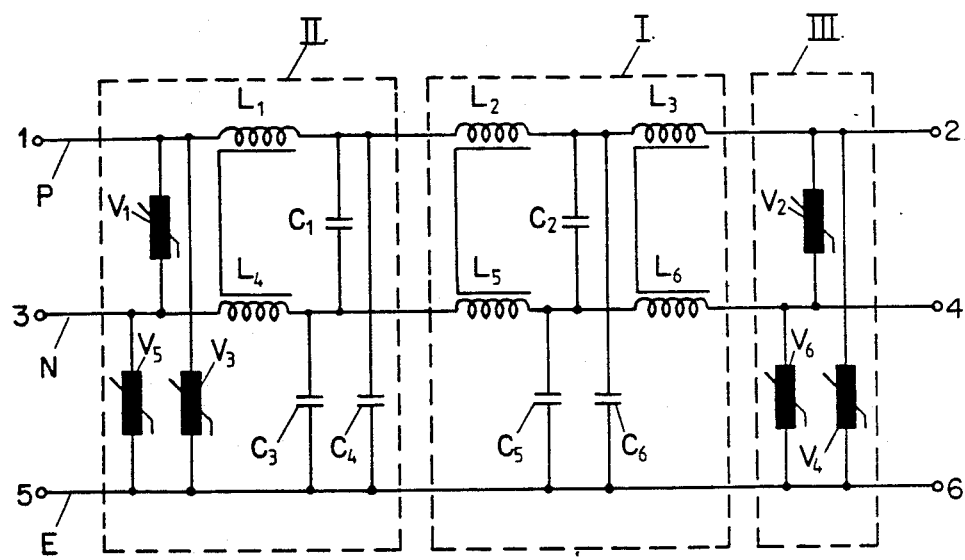
FIG. 1 is a circuit diagram of a filter circuit with ZnO surge arresters used according to the invention.

The filter circuit according to FIG. 1 represents an interference filter with surge protection for an alternating current electrical network consisting of a phase conductor P, a neutral conductor N and a ground conductor E.

The filter circuit has a supply terminal 1 on the network side and a terminal 2 on the consumer side for the phase conductor P, a terminal 3 on the network side and a terminal 4 on the consumer side for the neutral conductor N, and a terminal 5 on the network side and a terminal 6 on the consumer side for the ground conductor E.

Between the terminals 1 and 2 of the phase conductor P, a plurality of chokes $L_1$, $L_2$, and $L_3$ is connected. A corresponding plurality of chokes $L_4$, $L_5$ and $L_6$ is inserted between the terminals 3 and 4 of the neutral conductor N. The chokes $L_1$ and $L_4$, $L_2$ and $L_5$, and $L_3$ and $L_6$, respectively, are current compensated chokes, i.e. they are wound around a common ferromagnetic core.

Two so-called X capacitors $C_1$ and $C_2$ are connected between the phase conductor P and the neutral conductor N. The X capacitor $C_1$ is connected with the phase conductor P between the chokes $L_1$ and $L_2$ and with the neutral conductor between the chokes $L_4$ and $L_5$. The X capacitor $C_2$ is connected with the phase conductor P between the chokes $L_2$ and $L_3$ and with the neutral conductor N between the chokes $L_5$ and $L_6$.

Between the phase conductor P and the ground conductor E and between the neutral conductor N and the ground conductor E, four so-called Y capacitors $C_3$ to $C_6$ are provided. The Y capacitors $C_3$ and $C_5$ are connected with the neutral conductor N between choke $L_4$ and choke $L_5$, and between choke $L_5$ and $L_6$, respectively. The capacitors $C_4$ and $C_6$ are connected with the phase conductor P between choke $L_1$ and choke $L_2$, and between choke $L_2$ and choke $L_3$ respectively.

A ZnO surge arrester $V_1$ is connected between phase conductor terminal 1 and neutral conductor terminal 3. A ZnO surge arrester $V_2$ is connected between phase conductor terminal 2 and neutral conductor terminal 4. The phase conductor terminal 1 and the neutral conductor terminal 3 are connected with the ground conductor E through ZnO surge arresters $V_3$ and $V_5$, respectively. The phase conductor terminal 2 and the neutral conductor terminal 4 are connected with the ground conductor E through ZnO surge arresters $V_4$ and $V_6$, respectively.

With an alternating current voltage of 220 V with a frequency of 50 Hz and a layout of the filter circuit for a current of 6 A, the individual structural parts may be dimensioned to obtain a good broad band filter effect, as follows:

| | |
|---|---|
| $L_1$, $L_4$ | 1 mH |
| $L_2$, $L_3$, $L_5$, $L_6$ | 0.8 mH |
| $C_1$ | 0.3 µF |
| $C_2$ | 33 nF |
| $C_3$, $C_4$ | 1 nF |

| -continued | |
|---|---|
| $C_5$, $C_6$ | 2.2 nF |

As the ZnO surge arresters, those of the BOV line according to the pamphlet No. D HS 102480 DEF, edition 3/80 of BBC Brown, Boveri et Co., D-6800 Mannheim, and in particular Type No. BOV-250 S20K, may be used. These have a capacitance of approximately 1 nF below their pickup voltage.

In the sense of the invention, i.e. as a direct replacement of capacitances and as voltage limitations, the ZnO surge arresters $V_3$ to $V_6$ are used in the filter circuit described above. They are acting below their pickup voltage as further Y capacitors, in addition to the Y capacitors $C_3$ and $C_6$. Thus for example, the ZnO surge arrester $V_3$, together with the Y capacitor $C_4$ and the choke $L_1$, forms in the phase conductor P a so-called $\pi$ element with a low-pass effect. The same is true for the ZnO surge arresters $V_4$ with $C_6$ and $L_3$, $V_5$ with $C_3$ and $L_4$ and $V_6$ with $C_5$ and $L_6$. When the voltage between the phase conductor P and the ground conductor E or the neutral conductor N and the ground E attains the pickup voltage of the ZnO surge arresters $V_3$ to $V_6$, for example as the result of a disturbance occurring on the network or consumer side, the surge arresters pass into a highly conductive state and limit the voltage to their pickup level. The ZnO surge arresters $V_3$ to $V_6$ may therefore be considered multifunctional elements.

The ZnO surge arrester elements $V_1$ and $V_2$ are not used as multifunctional elements in the sense of the invention since, due to their capacitance which is merely within the nF range, they cannot replace the X capacitors $C_1$ and $C_2$ which have capacitances in the uF range. The function of the ZnO surge arresters $V_1$ and $V_2$ in the circuit described is therefore limited in the manner similar to the circuit discussed in the introduction and known from the catalog of the Schaffner Co., to their arresting effect for voltage surges between the phase conductor P and the neutral conductor N.

In certain applications where X capacitors with capacitances of up to 100 nF are adequate, the capacitors may be replaced by ZnO surge arresters.

The Y capacitors $C_3$ to $C_6$ could also be replaced in the filter circuit described by ZnO surge arresters. The fact that this has not been done in the present example is because it is sufficient for adequate protection against voltage surges to replace the Y capacitors placed adjacent the terminals by ZnO surge arresters. It is also intended to illustrate how filter circuits may be constructed with protection against voltage surges in a simple manner using commercially available high frequency filters without surge protection.

Thus, for example, the group of structural elements framed in FIG. 1 and designated I with the elements $L_2$, $L_3$, $L_5$, $L_6$, $C_2$, $C_5$ and $C_6$ is a commercial high frequency filter built into a closed housing of the Schaffner Elektronik AG, CH-4708 Luterbach, improved by means of the structural groups II (elements $L_1$, $L_4$, $C_3$, $C_4$, $V_1$, $V_3$, $V_5$) and III (elements $V_2$, $V_4$, $V_6$) with regard to its filter effect and supplemented by voltage surge protection.

The reason for providing surge arresters behind the high frequency filter (Part I) both on the network and the consumer side is the intention to limit voltage surges generated both on the network side and the consumer side and particularly to isolate them from the high frequency filter.

Figure 2:
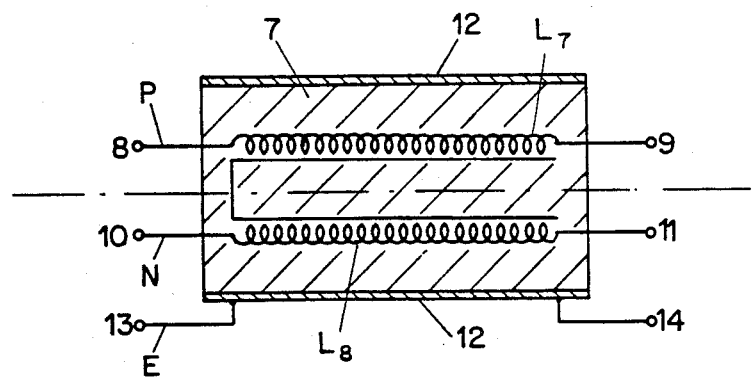
FIG. 2 is a cross-sectional view of a ZnO block with filter elements embedded therein.

FIG. 2 shows an example of an embodiment illustrating the manner in which the invention may be applied in relation to the spatial design layout optimally to a filter circuit which again consists of a phase conductor P, neutral conductor N and ground conductor E.

A cylindrical block 7 of a ZnO material is shown in section, in which the chokes $L_7$, $L_8$, specifically iron choke coils wound around a common core, are embedded without contacting each other. The chokes $L_7$ and $L_8$ are drawn for the sake of simplicity not in their actual geometrical shape, but with their electrical circuit symbols in FIG. 2. The leads of the chokes $L_7$ and $L_8$ are passed out of the ZnO block, on terminals 8, 9 for the phase conductor P and terminals 10, 11 for the neutral conductor N. The ZnO block 7 is provided on the outside with a conducting layer 12, connected with the ground conductor E by the terminals 13 and 14.

Inside the ZnO block 7 the chokes $L_7$ and $L_8$ for voltages between the individual conductors P, N and E under the pickup voltage of the ZnO material, are insulated both against each other and the conducting layer 12 and therefore have a certain divided X capacitance with respect to each other and a divided Y capacitance in relation to the conducting layer 12. The magnitude of these capacitances depends on the actual geometric dimensions of the entire layout. If the voltage between a pair of the three conductors P, N and E exceeds the pickup voltage of the ZnO material, a transverse current flows through the ZnO material, whereby the voltage is restricted to the level of the pickup voltage.

The filter circuits according to FIG. 1 or 2 may be built advantageously into solid housings, which may be for example in the form of adapter plugs or socket adapters, which therefore may be inserted simply into the supply line of an electrical device to be protected. The layout according to FIG. 2 may also be provided in the form of a feed-through sleeve for the supply line of the housing of an electrical device.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. An electrical apparatus comprising a filter circuit connected in an alternating current network including a phase conductor, a neutral conductor, and a ground conductor, and wherein said filter circuit protects said alternating current network against transient occurrences and voltage surges, said filter circuit including a plurality of capacitive elements, each of said capacitive elements having a value of up to approximately 100 nanofarads, said capacitive elements being zinc oxide surge arresters, said filter circuit being divided into first, second and third functional units connected in series, said first functional unit connected between said second and third functional units and comprising a high frequency filter, and said second and third functional units each comprising at least one of said zinc oxide surge arresters connected between said phase conductor and said neutral conductor, between said phase conductor and said ground connector, and between said neutral conductor and said ground conductor, respectively.

2. The apparatus of claim 1, wherein said filter circuit includes ohmic and/or inductive filter elements connected in series in said phase conductor and said neutral conductor, said filter elements being connected in series in the phase conductor and the neutral conductor and embedded separately from each other in a ZnO block.

3. An electrical apparatus comprising a filter circuit for the protection of an alternating current network against transient occurrences and voltage surges, wherein said alternating current network includes a phase conductor, a ground conductor and a neutral conductor, wherein said filter circuit includes capacitive elements with a value of up to approximately 100 nanofarads, wherein said capacitive elements are zinc oxide surge arresters, said filter circuit being divided into first, second and third functional units connected in series, said first functional unit connected between said second and third functional units and comprising a high frequency filter, and said second and third functional units each comprising at least one of said zinc oxide surge arresters connected between said phase conductor and said neutral conductor, between said ground conductor and said neutral conductor, and between said phase conductor and said ground conductor, respectively.

4. The apparatus of claim 3, wherein said filter circuit includes ohmic and/or inductive filter elements connected in series in said phase conductor and said neutral conductor, said filter elements being connected in series in the phase conductor and the neutral conductor and embedded separately from each other in a ZnO block.

5. An electrical apparatus comprising a filter circuit connected in an alternating current network including a phase conductor, a neutral conductor, and a ground conductor, wherein said filter circuit protects said alternating current network against transient occurrences and voltage surges and includes a capacitive element with a value of up to approximately 100 nanofarads, said capacitive element being a zinc oxide surge arrester, said filter circuit being divided into first, second and third functional units connected in series, said first functional unit connected between said second and third functional units and comprising a high frequency filter; and said second and third functional units each comprising zinc oxide surge arresters connected between said phase conductor and said neutral conductor, between said phase conductor and said ground conductor, and between said neutral conductor and said ground conductor.

6. An electrical apparatus comprising a filter circuit connected in an alternating current network including a phase conductor, a neutral conductor, and a ground conductor, and wherein said filter circuit protects said alternating current network against transient occurrences and voltage surges and includes a capacitive element with a value of up to approximately 100 nanofarads, said capacitive element being a zinc oxide surge arrester, said filter circuit including ohmic and/or inductive filter elements connected in series in said phase conductor and said neutral conductor, said filter elements being connected in series in the phase conductor and the neutral conductor and embedded separately from each other in a zinc oxide block.

7. The apparatus of claim 6, wherein said zinc oxide block is provided on its outer surface with a conductive layer, said conductive layer being connected with said ground conductor.

8. An electrical apparatus comprising a filter circuit for the protection of an alternating current network against transient occurrences and voltage surges, wherein said alternating current network includes a phase conductor, a ground conductor and a neutral conductor, wherein said filter circuit includes capacitive elements with a value of up to approximately 100 nanofarads, wherein said capacitive elements are zinc oxide surge arresters and wherein said surge arresters are connected between said phase conductor and said neutral conductor and between said ground conductor and said neutral conductor, respectively, said filter circuit being divided into first, second and third functional units connected in series, said first functional unit being connected between said second and third functional units and comprising a high frequency filter; and said second and third functional units each comprising zinc oxide surge arresters connected between said phase conductor and said neutral conductor, between said phase conductor and said ground conductor, and between said neutral conductor and said ground conductor.

9. An electrical apparatus comprising a filter circuit for the protection of an alternating current network against transient occurrences and voltage surges, wherein said alternating current network includes a phase conductor, a ground conductor and a neutral conductor, wherein said filter circuit includes capacitive elements with a value of up to approximately 100 nanofarads, wherein said capacitive elements are zinc oxide surge arresters and wherein said surge arresters are connected between said phase conductor and said neutral conductor and between said ground conductor and said neutral conductor, respectively, said filter circuit including ohmic and/or inductive filter elements connected in series in said phase conductor and said neutral conductor, said filter elements being connected in series in the phase conductor and the neutral conductor and embedded separately from each other in a zinc oxide block.

10. The apparatus of claim 4, wherein said ZnO block is provided on its outer surface with a conductive layer, said conductive layer being connected with said ground conductor.

11. An electrical apparatus including a filter circuit for protecting an alternating current network against transient occurrences and voltage surges, said alternating current network including a phase conductor, a ground conductor and a neutral conductor, said filter circuit comprising:
  a first phase conductor terminal;
  a second phase conductor terminal, said first and second phase conductor terminals connected in series in said phase conductor;
  a first plurality of chokes connected between said first and second phase conductor terminals;
  a first neutral conductor terminal;
  a second neutral conductor terminal, said first and second neutral conductor terminals connected in series in said neutral conductor;
  a second plurality of chokes connected between said first and second neutral conductor terminals;
  a first zinc oxide surge arrester connected between said first phase conductor terminal and said first neutral conductor terminal;

a second zinc oxide surge arrester connected between said first neutral conductor terminal and said ground conductor;

a third zinc oxide surge arrester connected between said first phase conductor terminal and said ground conductor; and wherein each of said first through third zinc oxide surge arresters have a capacitive value of up to approximately 100 nanofarads.

12. The electrical apparatus of claim 11, further including:

a fourth zinc oxide surge arrester connected between said second phase conductor terminal and said second neutral conductor terminal;

a fifth zinc oxide surge arrester connected between said second neutral conductor terminal and said ground conductor;

a sixth zinc oxide surge arrester connected between said second phase conductor terminal and said ground conductor;

each of said fourth through sixth zinc oxide surge arresters having a capacitive value of up to approximately 100 nanofarads.

* * * * *

UNITED STATES PATENT AND TRADEMARK OFFICE
CERTIFICATE OF CORRECTION

PATENT NO. : 4,760,485

DATED : July 26, 1988

INVENTOR(S) : Niyazi Ari, et al.

It is certified that error appears in the above-identified patent and that said Letters Patent is hereby corrected as shown below:

On the title page, Item [54] title of invention should read

-- [54]  ZINC OXIDE SURGE ARRESTERS --.

Signed and Sealed this

Twentieth Day of December, 1988

Attest:

DONALD J. QUIGG

*Attesting Officer*  *Commissioner of Patents and Trademarks*